(12) United States Patent
Sun et al.

(10) Patent No.: US 9,961,689 B2
(45) Date of Patent: May 1, 2018

(54) SPECTRUM MANAGEMENT SYSTEM AND METHOD

(71) Applicant: SONY CORPORATION, Minato-ku (JP)

(72) Inventors: Chen Sun, Beijing (CN); Xin Guo, Beijing (CN)

(73) Assignee: Sony Corporation, Tokyo (JP)

( * ) Notice: Subject to any disclaimer, the term of this patent is extended or adjusted under 35 U.S.C. 154(b) by 71 days.

(21) Appl. No.: 14/387,042

(22) PCT Filed: Apr. 9, 2014

(86) PCT No.: PCT/CN2014/074981
§ 371 (c)(1),
(2) Date: Sep. 22, 2014

(87) PCT Pub. No.: WO2014/169772
PCT Pub. Date: Oct. 23, 2014

(65) Prior Publication Data
US 2015/0189665 A1  Jul. 2, 2015

(30) Foreign Application Priority Data
Apr. 18, 2013 (CN) .......................... 2013 1 0136345

(51) Int. Cl.
*H04W 16/14* (2009.01)
*H04W 72/10* (2009.01)
*H04W 72/08* (2009.01)

(52) U.S. Cl.
CPC ......... *H04W 72/082* (2013.01); *H04W 16/14* (2013.01)

(58) Field of Classification Search
None
See application file for complete search history.

(56) References Cited

U.S. PATENT DOCUMENTS

| 8,948,038 | B1* | 2/2015 | Trott | H04W 16/14 |
| | | | | 370/252 |
| 9,578,515 | B2* | 2/2017 | Gaal | H04W 16/14 |
| 2006/0286986 | A1* | 12/2006 | Kim | H04W 16/04 |
| | | | | 455/450 |
| 2006/0288986 | A1* | 12/2006 | Liskow | F02M 55/025 |
| | | | | 123/469 |
| 2010/0056167 | A1* | 3/2010 | Guvenc | H04L 5/0007 |
| | | | | 455/450 |
| 2010/0216404 | A1* | 8/2010 | Hershey | H04W 72/0486 |
| | | | | 455/62 |

(Continued)

FOREIGN PATENT DOCUMENTS

| CN | 101827371 | 9/2010 |
| CN | 102202314 | 9/2011 |

OTHER PUBLICATIONS

International Search Report and Written Opinion dated Jul. 1, 2014, in PCT/CN14/074981 filed Apr. 9, 2014.

*Primary Examiner* — Duc T Duong
(74) *Attorney, Agent, or Firm* — Oblon, McClelland, Maier & Neustadt, L.L.P.

(57) ABSTRACT

A spectrum management system includes a circuit that identifies reference points for a secondary communication system. The spectrum management system then determines spectrum resources for the secondary communication system based on whether the reference points are positive or negative.

18 Claims, 9 Drawing Sheets

(56) References Cited

U.S. PATENT DOCUMENTS

| | | | |
|---|---|---|---|
| 2010/0248739 A1* | 9/2010 | Westerberg | H04W 72/0486 455/453 |
| 2011/0194503 A1* | 8/2011 | Stanforth | H04W 16/14 370/329 |
| 2011/0286401 A1* | 11/2011 | Wijting | H04W 16/14 370/329 |
| 2013/0039325 A1* | 2/2013 | Guo | H04W 16/14 370/329 |
| 2013/0114433 A1* | 5/2013 | Park | H04W 16/02 370/252 |
| 2013/0273953 A1* | 10/2013 | Srikanteswara | H04W 16/14 455/509 |
| 2013/0331114 A1* | 12/2013 | Gormley | H04W 72/082 455/452.1 |
| 2014/0080535 A1* | 3/2014 | Gauvreau | H04W 16/14 455/513 |
| 2014/0187251 A1* | 7/2014 | Viswanathan | H04W 72/082 455/450 |
| 2015/0087346 A1* | 3/2015 | Dahlman | H04W 16/14 455/501 |
| 2015/0281972 A1* | 10/2015 | Prytz | H04W 16/14 370/329 |
| 2015/0373554 A1* | 12/2015 | Freda | H04W 16/14 455/450 |

\* cited by examiner

SPECTRUM MANAGEMENT SYSTEM AND METHOD

FIELD OF THE INVENTION

The disclosure generally relates to a communication technical field, in particular to a spectrum management system and method for performing spectrum management in communication.

BACKGROUND OF THE INVENTION

With the development of wireless communication system, service requirement of user for high quality, high speed and high services is more and more. The wireless communication operators and equipment providers need to keep improving in order to satisfy the requirement of the user. This requires a large amount of spectrum resources to support new services and satisfy requirement for high speed communication. However, the limited spectrum resources have been allocated to fixed operators and services. New available spectrum is rare and/or expensive. In such case, an idea of dynamically using spectrum has been proposed, that is, spectrum resources which have been allocated to some services but not been exploited are dynamically used. For example, the spectrum of channels on which no program is being broadcasted in the digital television broadcast spectrum is dynamically used to perform wireless mobile communication without interfering with the normal receiving of television signals.

In such application instance, since the television broadcast spectrum per se is used for television broadcast system, the television broadcast system is regarded as a primary system, the television is regarded as a primary user, the mobile communication system is regarded as a secondary system, and the receiver in the mobile communication system is regarded as a secondary user. In other words, the primary system described herein may refer to the system with authority of using spectrum such as the television broadcast system, and the secondary system may refer to the system without authority of using spectrum which can use the spectrum of the primary system or its adjacent spectrum appropriately only when the primary system does not use such spectrum.

This communication manner of the primary and secondary systems coexisting requires that the application of the secondary system does not cause any adverse influence to the application of the primary system, or, the influence caused by the secondary system to the primary system may be controlled to an allowable range of the primary system. In the case that the influence to the primary system is kept in a certain range, the spectrum resources of the primary system may be allocated to a plurality of secondary systems.

Specifically, the primary and secondary systems may operate on the same frequency band or different frequency bands. In the case that the frequency bands used by the primary and secondary systems are adjacent to each other, since the adjacent channel leakage ratio of the transmitter and the adjacent channel selectivity of the receiver, the secondary system still may interfere with the primary system.

Existing provisions, such as Conference of European Posts and Telecommunications (CEPT), "Draft of ECC report: Technical and operational requirements for the operation of white space devices under geo-location approach", ECC186, January 2013, prescribe how to calculate available primary system spectrum at a certain position, but not prescribe when a plurality of secondary systems need to use the spectrum resources of the primary system, how to selectively allocate the spectrum resources to the secondary systems such that certain performance is better or entire spectrum utilization is more efficient.

In addition, when excess secondary systems share the available primary system spectrum, it is possible that each secondary system obtains a little available spectrum resource, and thereby at least part of the secondary systems can not satisfy the requirement of application. According to the solution proposed in CN101990289A for example, the usage requirements of all of the secondary systems may be calculated, and then the secondary systems which are not advantageous to utilize the spectrum resources of the primary system may be removed according to priority and the like. However, when the number of the secondary systems is large, the system overhead is large.

SUMMARY OF THE INVENTION

To address at least those problems discussed above, in one exemplary aspect the present advancements include a spectrum management system that includes circuitry that identifies reference point information for a secondary communication system, and that determines spectrum resources for the secondary communication system based on whether the reference point information is positive or negative.

In a second exemplary aspect, a method of spectrum management includes identifying, using circuitry of a spectrum management system, reference point information for a secondary communication system, and determining, by the circuitry of the spectrum management system, spectrum resources for the secondary communication system based on whether the reference point information is positive or negative.

In a third exemplary aspect, a non-transitory computer-readable medium includes computer-readable instructions that when executed by a computer cause the computer to perform a spectrum management method that includes identifying reference point information for a secondary communication system, and determining spectrum resources for the secondary communication system based on whether the reference point information is positive or negative.

BRIEF DESCRIPTION OF THE DRAWINGS

The above and other objects, features and advantages of the disclosure may be obvious by referring to the subject matter of the invention and the description of the embodiments thereof in conjunction with the Drawings. In the Drawings.

DETAILED DESCRIPTION OF THE INVENTION

Figure 1:
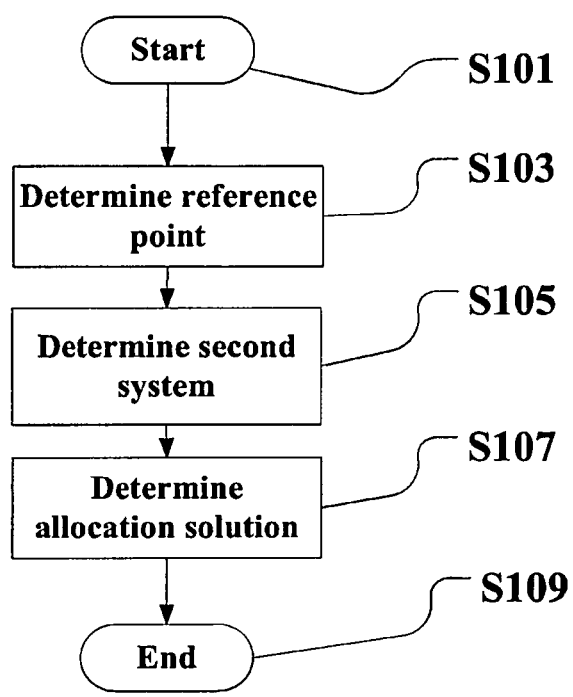
FIG. 1 is a flowchart illustrating an entire process of a spectrum management method according to an embodiment of the disclosure.

An embodiment of the disclosure will be described below in conjunction with the figures.

The description will be made in the following order.
1. Entire process of the spectrum management method
2. Step of determining reference point
3. Step of determining second system
4. Step of determining allocation solution
5. Configuration of the spectrum management apparatus
6. Specific application scenario of the embodiment of the disclosure
7. Hardware configuration example 1. Entire Process of the Spectrum Management Method Hereinafter, the entire process of the spectrum management method according to the embodiment of the disclosure will be described in conjunction with FIG. 1.

In FIG. 1, the spectrum management method starts at step S101, and proceeds to step S103.

At step S103, a reference point is determined. The reference point comprises at least one parameter indicating corresponding spectrum usage of a second system. Then, the process proceeds to step S105.

At step S105, at least one second system is determined to be the second system occupying the spectrum resources of a first system based on the reference point. Then, the process proceeds to step S107.

At step S107, an allocation solution of allocating the spectrum resources of the first system to the at least one second system is determined. Then, the process proceeds to step S109 and ends.

Hereinafter, respective steps of the spectrum management method will be described in detail.

It should be noted that as an example, hereinafter television broadcast system is regarded as the first system and mobile communication system or wireless LAN system is regarded as the second system.

As another example, a macrocell base station and the user thereof may be regarded as the first system, and a microcell (picocell) base station coverage of which overlaps with the coverage of the macrocell base station and which shares spectrum resources with the macrocell base station and the user of the microcell base station may be regarded as the second system.

However, those skilled in the art should understand that the scenario to which the embodiment of the disclosure may be applied is not limited to this. For example, when an operator deploys a new base station to provide new service, the existing base station and the service it provides have a priority to use spectrum. At this time, the existing base station and the users thereof may be regarded as the first system and the new base station and the users thereof may be regarded as the second system. Of course, the second system may not comprise base station, but only comprise a plurality of users which communicate with each other through the new service.

In addition, the spectrum management method herein is used to manage the utilization of spectrum resources of the first system by the second system. In other words, the management object is for example whether the second system utilizes the spectrum resources of the first system and how much spectrum resources the second system utilizes. More specifically, for example, the management may comprise not only allocating the spectrum resources of the first system to the second system which has not utilized the spectrum resources, but also not allocating the spectrum resources of the first system to the second system which is utilizing the spectrum resources, and adjusting the spectrum resources of the first system utilized by the second system which is utilizing the spectrum resources.

2. Step of Determining Reference Point

Firstly, the concept of reference point will be explained. As described above, the reference point may comprise at least one parameter indicating corresponding spectrum usage of the second system. In other words, the reference point may be a set of the at least one parameter. To be more specific, the reference point information can be regarded as including at least one characteristic of another secondary communication system. The other secondary communication system can be a physical secondary communication system or a simulated secondary communication system based on history record etc.

The spectrum usage may comprise at least one of geographic position, air interface information (such as LTE (Long Term Evolution), CDMA (Code Division Multiple Access), WiFi (Wireless Fidelity), OFDM (Orthogonal Frequency Division Multiplexing) and GSM (Global System for Mobile Communications)), antenna height, transmission template and frequency band of the second system. In other words, the spectrum usage may also comprise one or more of geographic position, air interface information, antenna height, transmission template and frequency band of the second system.

Therefore, the spectrum usage may be different due to different type of the second system (for example, in the case that the spectrum usage comprises air interface types of the second system, the spectrum usage having different air interface information types is different), or be common to various second systems (for example, in the case that the spectrum usage comprises geographic position of the second system, the spectrum usage of various second systems at such geographic position is the same).

It should be noted that herein the spectrum usage comprises an inherent attribute of the second system which uses the spectrum. Moreover, the "utilization of spectrum resources of the first system by the second system" mentioned above refers to whether the second system utilizes the spectrum resources of the first system and how much spectrum resources the second system utilizes.

The reference point comprises quantization indication of the spectrum usage of the second system. In other words, the reference point may comprise one or more parameters, such parameter(s) indicates the spectrum usage. For example, the geographic position information may be parameterized with coordinates, the antenna height may be parameterized with length, the transmission template may be parameterized with number or fading of the frequency bands corresponding to different ratio frequency shift intervals (for example, see IEEE 802.11p, "Wireless access in vehicular environment", 2010), and the air interface information may be parameterized with different integer indexes. Therefore, the reference point comprising parameters may represent corresponding spectrum usage of the second system. In addition, the reference point may comprise specific spectrum information corresponding to the above spectrum usage such as specific frequency band utilized at a certain geographic position.

As described later, one or more reference points, that is, the usage of one or more spectrums by the second system may be determined to be a reference, and thereby a second system may be determined according to such spectrum usage to be the second system which utilizes the spectrum resources of the first system.

For example, the reference point may comprise at least one of a positive reference point and a negative reference point.

As for the positive reference point, in the case of spectrum usage corresponding to this reference point, it is desired that the best utilization of the spectrum resources of the first system be achieved, for example, the spectrum resources of the first system which may be utilized by the second system are the most, with respect to at least one of the parameters comprised in the positive reference point. In other words, the positive reference point corresponds to the spectrum usage advantageous to utilize the spectrum resources of the first system by the second system. Therefore, the more similar between the spectrum usage and the positive reference point is, the more likely the second system is allocated the spectrum resources of the first system.

In contrast, as for the negative reference point, in the case of spectrum usage corresponding to this reference point, the best utilization of the spectrum resources of the first system cannot be achieved, for example, the spectrum resources of the first system which may be utilized by the second system are the least, with respect to at least one of the parameters comprised in the negative reference point, which is not desirable. There is another possibility that in the case of spectrum usage corresponding to this reference point, the spectrum resources of the first system which is being used by the second system is not enough to meet the second system's service requirement, and therefore the second system requires more spectrum resources of the first system, which will be described in detail later. In other words, the negative reference point corresponds to the spectrum usage disadvantageous to utilize the spectrum resources of the first system by the second system. Therefore, the more similar between the spectrum usage and the negative reference point is, the more likely the second system is not allocated the spectrum resources of the first system.

Of course, the reference point may comprise only the positive reference point, or only the negative reference point, or the positive reference point and the negative reference point both. It is to be understood by the skilled person in the art that the spectrum management method might comprises step of determining the reference point negative or positive.

Those skilled in the art should understand that although hereinafter the reference point corresponds to the spectrum usage only comprising the geographic position of the second system (as for the second system which is a mobile communication system, the geographic position thereof is the geographic position of base station), the reference point may also be expanded to the spectrum usage comprising more contents.

The reference point may be determined in at least one of following manners: 1) estimating at least a part of spectrum usage among spectrum usage of each second system; 2) based on history record of the spectrum usage; 3) based on the degree of the spectrum resources of the first system utilized by the second system meeting such second system's service requirement; and 4) based on information, from the second system, of the corresponding second system releasing the spectrum resources of the first system occupied by such second system.

Firstly, the method of estimating at least a part of spectrum usage among spectrum usage of each second system will be described. In such example, the object of estimating is the second system at various geographic positions.

Although all geographic positions at which the second system may be located may be estimated, the number of geographic positions to be estimated can be reduced. For example, the estimation may be performed with respect to predetermined geographic positions or the geographic positions which meet a predetermined condition. As an example, the geographic positions at which a plenty of second systems occur or fluidity of the second system is large (that is, the geographic positions at which the second system releases spectrum or applies to use spectrum frequently) may be estimated.

Figure 2:
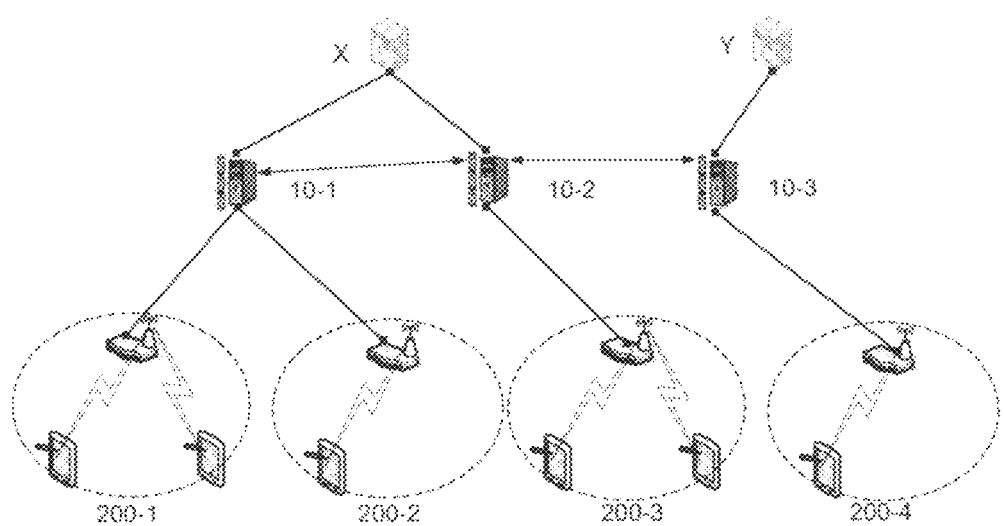
FIG. 2 is a schematic diagram illustrating a plurality of spectrum management apparatuses managing a plurality of second systems.

There is a case that a plurality of spectrum management apparatuses manages a plurality of second systems respectively. As shown in FIG. 2, the spectrum management apparatus 10-1 manages the second systems 200-1, 200-2, the spectrum management apparatus 10-2 manages the second system 200-3, and the spectrum management apparatus 10-3 manages the second system 200-4. At this time, one of the spectrum management apparatuses may be responsible for calculating all of the reference points. Alternatively, each spectrum management apparatus may calculate the reference point in the coverage of the second system which it manages, and repeated calculation of the reference point may be avoided by communication between the spectrum management apparatuses.

The spectrum calculation of the secondary system need to consider interference to other primary system. One spectrum manager may access other spectrum manager to obtain necessary information in order to calculate available spectrum of the secondary system, and the calculation result may be sent to spectrum management apparatuses which manage different secondary systems.

Figure 3:
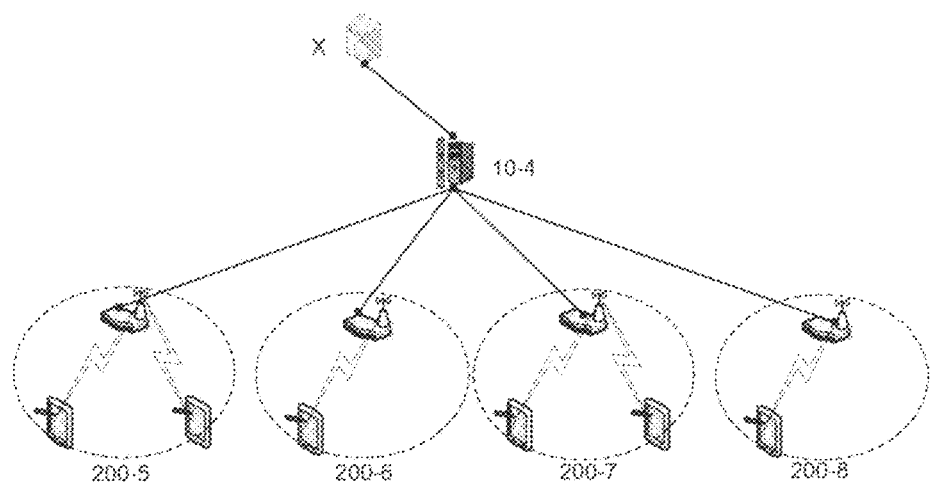
FIG. 3 is a schematic diagram illustrating one spectrum management apparatus managing a plurality of second systems.

Corresponding to the case shown in FIG. 2, there is a case that one spectrum management apparatus manages all of the second systems. As shown in FIG. 3, spectrum management apparatus 10-4 manages the second systems 200-5, 200-6, 200-7 and 200-8.

When geographic positions is estimated, the geographic position at which the interference caused by the second system to the first system is lower than a first interference threshold and at which the spectrum resources allocated to the second system is the most may be determined to be the positive reference point, and/or the geographic position at which the interference caused by the second system to the first system is higher than or equal to the first interference threshold and at which the spectrum resources allocated to the second system is the least may be determined to be the negative reference point. It should be noted that herein the first interference threshold may be a threshold determined by those ordinary skilled in the art according to design requirement and actual situation.

Of course, the reference point may be determined by other suitable manners. For example, with respect to each candidate geographic position, the geographic position at which the interference caused by the second system to the first system has a negative weight, the spectrum resources allocated to the second system by the first system has a positive weight, and the weight sum of the interference to the respective first system and the allocated spectrum resources may be set to the positive reference point.

Secondly, the method of determining the reference point based on the history record will be described.

One manner is to perform estimation directly according to the history record. Since the spectrum management apparatus which manages the second system may record history record of the spectrum resources allocated to the second system by the first system, the geographic position of the second system which is advantageous/disadvantageous to utilize the spectrum resources of the first system may be determined to be the reference point.

Another manner is to predict the geographic position at which the second system will release the spectrum resources of the first system which are being utilized according to the history record. Utilization of spectrum resources of the first system by some second systems is regular, for example, each time the spectrum resources of the first system have been utilized for a predetermined time, the spectrum resources will be released. Therefore, such rules will be obtained according to the history record and accordingly the geographic position at which the second system will release the spectrum resources of the first system may be predicted. Such geographic position may be determined to be the positive reference point. This is because release of the spectrum resources of the first system results in that the spectrum resources is rich at such geographic position, and it is generally desired to allocate the spectrum resources of the first system to the second system at such geographic position.

Next, the method of determining the reference point based on the degree of the spectrum resources of the first system utilized by the second system meeting such second system's service requirement will be described.

At some geographic positions, when the second system has utilized the spectrum resources of the first system but still can not meet the expected requirement for communication quality, it shall be allocated additional spectrum resources of the first system, that is, reversed spectrum resources. At this time, the geographic position may be determined to be the negative reference point.

This is because that when the second system has not enough available resources of the first system, the spectrum resources of the first system in the proximity of such geographic position shall be released or reduced such that the second system may obtain additional available spectrum resources of the first system. Of course, it is not desired to allocate the spectrum resources of the first system to other second systems. Further, the spectrum resources of the first system utilized by the other systems in the proximity of such geographic position shall be released to be used by the second system which does not meet requirement to the spectrum resource.

At last, the method of determining the reference point based on the information, from the second system, of the corresponding second system releasing the spectrum resources of the first system occupied by such second system will be described.

When information, directly from the second system or indirectly from the second system via a device such as a spectrum management apparatus, of such second system releasing the spectrum resources of the first system it utilizes is received, the geographic position of such second system may be determined to be the positive reference point. As described above, this is because that the releasing of the spectrum resources result in that the spectrum resources is rich at such geographic position, and it is generally desired to allocate the spectrum resources of the first system to the second system at such geographic position.

No matter through which manner the reference point is determined, the determined reference point may be updated periodically, or may be updated only when usage of the spectrum resources of the first system and/or the second system changes, or even may not be updated. The reason to update the reference point is that the usage of the spectrum resources by the second system at least partially depends on the usage of the spectrum resources by the first system. In other words, since the usage of the spectrum resources by the first system changes, the degree of the first system sustains the interference caused by the second system utilizing the spectrum resources of the first system may also changes.

3. Step of Determining Second System

After the reference point is determined, the determined reference point may be announced, that is, information of the determined reference point may be announced. The information of the determined reference point may be announced to the spectrum management apparatus determining the reference point and other spectrum management apparatuses, or to the second system managed by the spectrum management apparatus determining the reference point.

Herein, the spectrum management apparatus announcing the reference point information may be known as a reference point information sender, and the spectrum management apparatus or the second system may be known as a reference point information receiver. It should be noted that the reference point information sender may be the reference point information receiver.

In an example of determining that a second system is the second system which utilizes the spectrum resources of the first system, the reference point information receiver may recommend a second system to the reference point information sender such that the second system which utilizes the spectrum resources of the first system (hereinafter also known as a second system which participates in allocation of the spectrum resources) may be determined. Hereinafter two recommendation manners are given.

Figure 4:
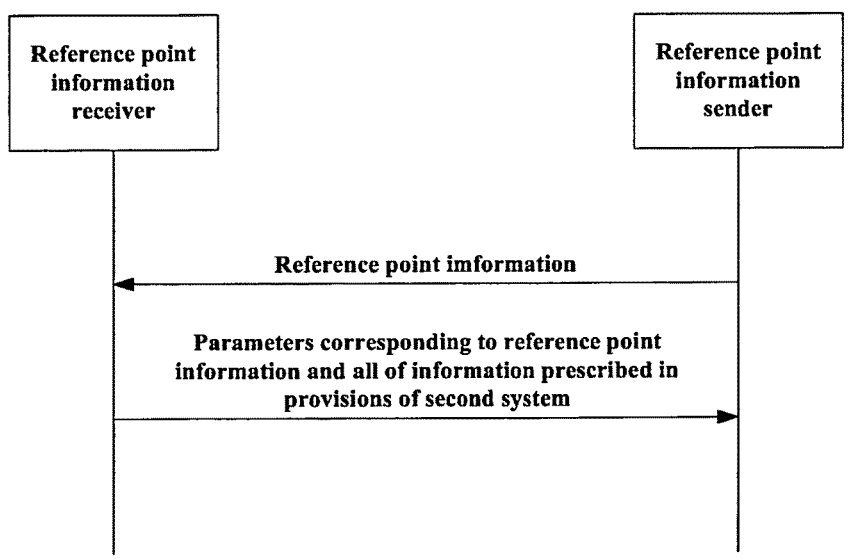
FIG. 4 is a diagram illustrating a process example related to announcement of reference point information and recommendation of a candidate second system.

Recommendation manner 1: information of all of the second systems which want to participate in allocation of the spectrum resources of the first system is sent to the reference point information sender. The sent information may comprises parameters of the second system corresponding to the parameters of the reference point and all of information prescribed in related provisions (such as CEPT, "Draft of ECC report: Technical and operational requirements for the operation of white space devices under geo-location approach", ECC186, January, 2013) which shall be submitted by the second system to obtain the spectrum resources of the first system. In addition to the necessary information prescribed in the provisions which shall be submitted, information corresponding to the parameters of the reference point may comprise other information. FIG. 4 illustrates such process.

Figure 5:
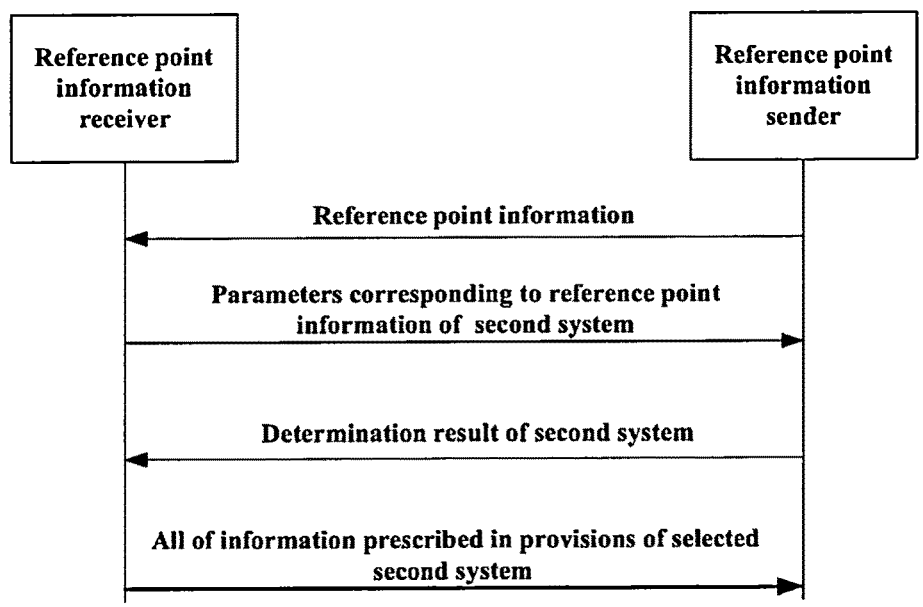
FIG. 5 is a diagram illustrating another process example related to announcement of reference point information and recommendation of a candidate second system.

Recommendation manner 2: process of the reference point information receiver may have two steps. Firstly, basic parameter values of the second system determined to be recommended according to the reference point information is sent. Then feedback information of the reference point information sender is waited for. If the feedback information indicates that the recommended second system is determined to participate in allocation of the spectrum resources, the reference point information receiver sends information of the selected second system prescribed in the provisions which shall be submitted to the reference point information sender. FIG. 5 illustrates such process. With such process, the data amount of sent information of the second system is saved, and thereby the system overhead is reduced.

Alternatively, when the reference point information receiver is a spectrum management apparatus, in the process of recommending a second system, the second system may be recommended according to the proximity degree between spectrum usage of each second system and the reference point, degree of requirement of each second system to spectrum or prior knowledge (such as probability that the managed second system is determined successfully to be the second system which participates in allocation of the spectrum resources after it is recommended) and the like, instead of recommending all of the second systems to the reference point information sender. Thus the number of the submitted second systems and the interaction information amount may be further reduced, and thereby the system burden may be reduced.

In addition, when the reference point information receiver is a second system, the second system may determine whether to recommend itself to the reference point information sender according to situation of itself. For example, the determination may be based on the proximity degree between spectrum usage of the second system and the reference point.

The spectrum management apparatus as the reference point information sender may determine the second system which participates in allocation of the spectrum resources among the recommended second systems based on the determined reference point.

Similarly, in an example of determining that a second system is not the second system which utilizes the spectrum resources of the first system, the reference point information receiver may recommend a second system to be the second system which not utilizes the spectrum resources of the first system (hereinafter also known as a second system which dose not participate in allocation of the spectrum resources) to the reference point information sender. In other words, at this time, the recommended second system is the second system which does not want to participate in allocation of the spectrum resources, for example because that the spectrum usage of such second system is more similar to the negative reference point. It should be noted that determining that a second system does not utilize the spectrum resources of the first system means that determining the second system which utilizes the spectrum resources of the first system.

From another perspective, determining a second system to be the second system which not utilizes the spectrum resources of the first system may be done by determining that a second system which is utilizing the spectrum resources of the first system will release the spectrum resources which it is utilizing. When determining to release which ones of the spectrum resources which the second system is utilizing, the second system which will release the spectrum resources may be determined according to at least one of the proximity degree between spectrum usage of the second system and the negative reference point, the situation of the spectrum resources which the second system may release, the priority of service of the second system.

However, the process of announcing the reference point may be omitted, such as in the case that one spectrum management apparatus manages a plurality of second systems. At this time, the spectrum management apparatus which has determined the reference point may determine the second system which participates in allocation of the spectrum resources among the second systems which it manages.

One example determination manner is to determine the second system in which the degree of similarity between spectrum usage of such second system and the positive reference point is higher than a first positive threshold and/or the degree of similarity between spectrum usage of such second system and the negative reference point is lower than a first negative threshold to be the second system which participates in allocation of the spectrum resources. In other words, in the case that the reference point corresponds to the geographic position, the closer a second system is to the positive reference point, the more likely the second system is determined to participate in allocation of the spectrum resources, and the farther a second system is from the negative reference point, the more likely the second system is determined to participate in allocation of the spectrum resources. And/or, the second system in which the degree of similarity between spectrum usage of such second system and the positive reference point is lower than a second positive threshold and/or the degree of similarity between spectrum usage of such second system and the negative reference point is higher than a second negative threshold may not be determined to be the second system which participates in allocation of the spectrum resources. In addition, a part of the spectrum resources of the first system occupied by the second system in which the degree of similarity between spectrum usage of such second system and the negative reference point is higher than a second negative threshold may be released. In other words, in the case that the reference point corresponds to the geographic position, the farther a second system is from the positive reference point, the more likely the second system is determined not to participate in allocation of the spectrum resources, and the closer a second system is from the negative reference point, the more likely the second system is determined not to participate in allocation of the spectrum resources, wherein even a part of the spectrum resources of the first system occupied by the second system may be released. The first positive threshold and the second positive threshold herein may be appropriately determined by those ordinary skilled in the art, and may be or not be equal to each other. Similarly, the first negative threshold and the second negative threshold herein may be appropriately determined by those ordinary skilled in the art, and may be or not be equal to each other.

It should be understood based on the above disclosure that, in fact, the spectrum management apparatus can manage the spectrum resources of the second systems by first identifying the second system whose spectrum usage status should be managed (e.g. the second system requests for resource); determining whether there is any reference point for the second system (e.g. based on the proximity thereto); and then allocating or adjusting the spectrum resources of the second system based on the reference point information. In this way, the sequence of the step of determining reference point and step of determining second system shown in FIG. 1 can be switched.

Figure 6:
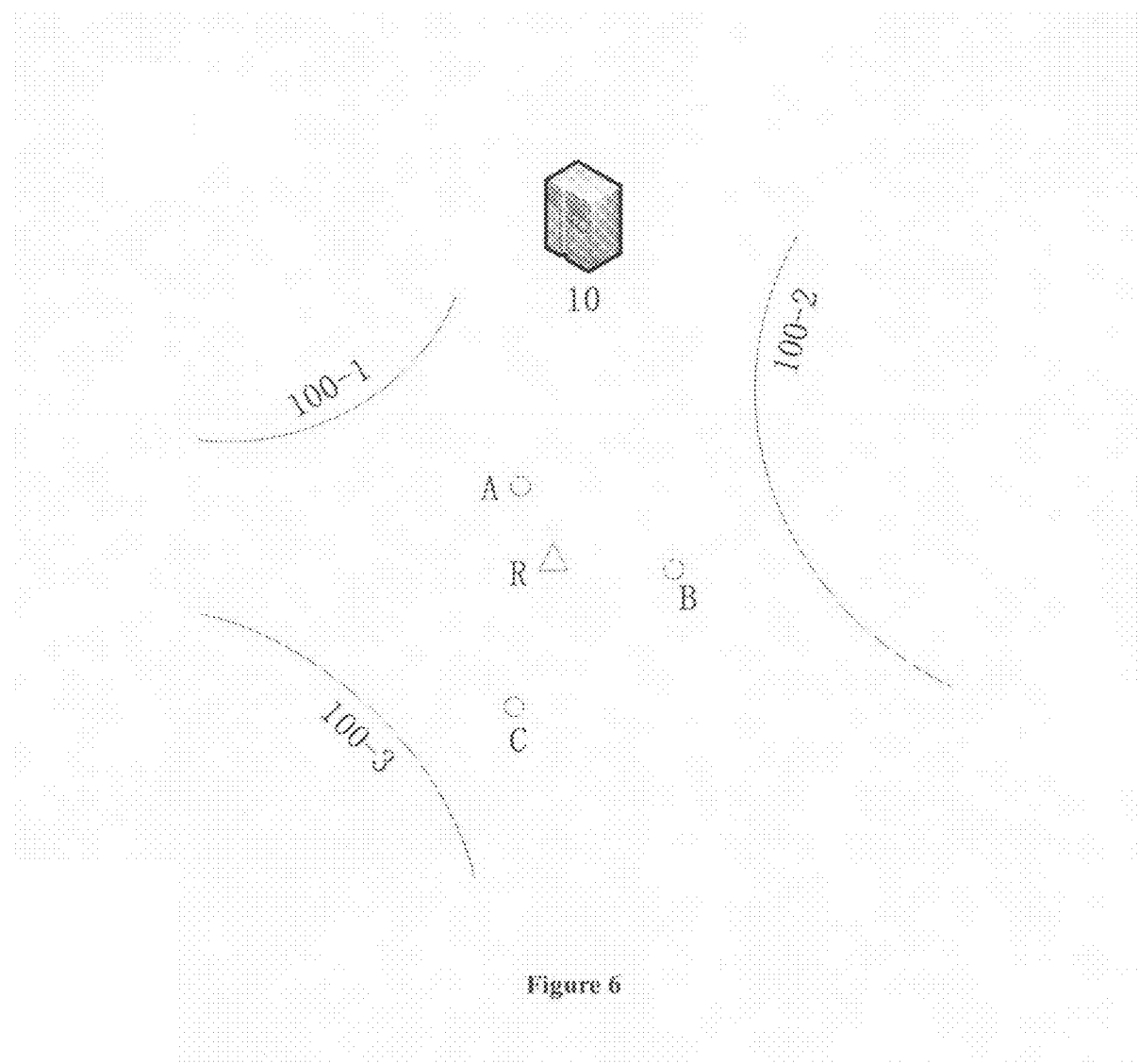
FIG. 6 is a schematic diagram illustrating the second system determined to participate allocation of spectrum resources.

FIG. 6 illustrates a schematic diagram of determining the second system which participates in allocation of the spectrum resources. In FIG. 2, reference point corresponds to geographic position, and the triangular reference point R is a positive reference point. A, B, C indicate the geographic positions at which second systems A, B, C are located respectively. In addition, it illustrates a spectrum management apparatus which manages the second systems A, B, C and three first systems 100-1, 100-2, 100-3 which provide the spectrum resources to the second systems.

It is assumed that only two second systems need to be selected as the second systems which participate in allocation of the spectrum resources. Thus the second systems A and B which are closer to the reference point R may be determined to be the second systems which participate in allocation of the spectrum resources.

It should be noted that before the above determination, A, B, C may be in any situation of utilizing the spectrum resources of the first system. For example, it is possible that each of the second systems A, B, C does not obtain the spectrum resources from the first system, or all of the second systems A, B, C are obtaining the spectrum resources from the first system, or only the second systems A, C are allocated the spectrum resources from the first system.

After the above determination, only the second systems A, B are allocated the spectrum resources from the first system.

The above example shows only one reference point. In the case that there are multiple reference points, it is assumed that the coordinates of the mth reference point is $(x_m, y_m)$, m=1,2, ... M, and there are M reference points (all of them are assumed to be the positive reference points). It is assumed to select in L pieces of position information of the second systems $(x_l, y_l)$, l=1,2, ..., L. Spatial correlation coefficients $\rho_l$ between each of candidate geographic positions of the second systems and all of the geographic positions of the reference points are calculated as indicated equation (1) for example:

$$\rho_l = \sum_{m=1}^{M} \sqrt{(x_l - x_m)^2 + (y_l - y_m)^2} \quad (1)$$

The obtained spatial correlation coefficients of the second systems are arranged in a descending order, and N second systems with largest spatial correlation coefficients may be selected to perform spectrum allocation. This may enable these second systems to exploit the released or available spectrum resources.

In addition, different reference points may have different weights. For example, the reference point with higher spectrum utilization efficiency is more important for determination of the second system which participates in allocation of the spectrum resources, and may have a higher weight.

In addition, the determination of the second system which participates in allocation of the spectrum resources may be based on other factors other than the reference point such as priority. The second system with a higher priority, for example the second system carrying the service which requires higher communication quality such as video telephone, may be far from the reference point, but it may still be determined to be the second system which participates in allocation of the spectrum resources.

One specific implementation manner is to make the second systems with different priorities have different weights.

A specific situation of determining the second system is given below. In such situation, the spectrum resources obtained by second system P with a higher priority is not enough to meet the service requirement of the second system P, and therefore another second system P with a lower priority in the proximity of the second system P needs to release the spectrum resources of the first system which it is utilizing such that the second system P may obtain more spectrum resources of the first system.

Firstly, since the spectrum resources of the first system utilized by the second system P do not meet the service requirement thereof, the geographic position at which the second system P is located is determined to be the negative reference point.

Thereafter, since the geographic position at which the second system P is located is close to the negative reference point, and the priority of the second system Q is lower, the second system Q is determined to be the second system which releases the spectrum resources of the first system. In other words, the second system Q is not determined to be the second system which utilizes the spectrum resources of the first system.

Then the second system Q releases the spectrum resources of the first system which it is utilizing. Information regarding this release may be provided to the spectrum management apparatus responsible for spectrum management directly or indirectly through the second system Q. Since the second system Q releases the spectrum resources, the geographic position at which the second system Q is located is determined to be the positive reference point.

At this time, since the second system P has a higher priority and is close to the positive reference point, although it is also located at the negative reference point, the second system P may be determined to be the second system which utilizes the spectrum resources of the first system by setting a suitable weight.

It is assumed that only the second system P is determined to be the second system which utilizes the spectrum resources of the first system, the second system P may receive the spectrum resources of the first system released by the second system Q.

4. Step of Determining Management Solution

Hereinafter the step of determining the management solution will be described.

In practice, the management solution of the invention comprises at least one of a resource allocation solution and a resource release solution. Herein the management solution may be determined with any existing manners. Since the number of second systems to be managed is limited based on the reference point as described above, even the allocation solution is determined with an existing solution, the system overhead may be reduced and/or the system performance may be improved because the number of the second systems which participate in calculation is reduced.

Herein, a preferable manner of determining the allocation solution will be described in detail. In other words, the allocation solution of allocating the spectrum resources of the first system to the second system may be determined in the following manner:

when the number of the at least one second system is more than 1, dividing all the spectrum resources of the first system, which are able to be allocated to the second system, into a plurality of unit spectrum resources, and allocating, in a predetermined pattern, the unit spectrum resources to the second systems, each of which has not reached the upper limit of spectrum usage yet, and in each of which such second system's interference to the first system does not reach a second interference threshold in the case that such unit spectrum resource is already allocated to such second system, until all the unit spectrum resources have been allocated or until there is no more second system, each of which has not reached the upper limit of spectrum usage yet, and in each of which such second system's interference to the first system does not reach the second interference threshold in the case that such unit spectrum resource is already allocated to such second system. It should be noted that herein the second interference threshold may be a threshold determined by those ordinary skilled in the art according to design requirement and actual situation, and may be or not be equal to the first interference threshold as described above.

It should be noted that the allocation performed herein may comprise not only allocating the spectrum resources of the first system to the second system which has not utilized the spectrum resources of the first system, but also not allocating the spectrum resources of the first system to the second system which is utilizing the spectrum resources of the first system, and adjusting the spectrum resources of the first system utilized by the second system which is utilizing the spectrum resources. In other words, all of the spectrum resources of the first system which are able to be allocated are re-allocated to the second system determined to utilize the spectrum resources of the first system.

It should be understood by those ordinary skilled in the art that allocation unit determining process may be performed in other suitable manners. For example, adjustment is performed based on the second systems which have been allocated the spectrum resources of the first system, or a part or all of the second systems are selected from the second systems which have been allocated the spectrum resources of the first system to release the spectrum resources which the second systems are utilizing, or these two process are combined.

The phrase "predetermined pattern" herein may mean that one unit spectrum resource is allocated to one second system meeting the above requirement each time, and also mean that a plurality of unit spectrum resources is allocated to one second system meeting the above requirement each time. In addition, the phrase "predetermined pattern" herein may comprise allocating the unit spectrum resources to each second system in a predetermined order or a random order.

One preferable manner is that when allocating the unit spectrum resources to the second system, the allocation is performed in a descending order of the unit spectrum resource benefit, or in a descending order of the degree of requirement of the second systems to the spectrum. The unit spectrum resource benefit may be defined as at least one of the service increment and the economic benefit brought by each time the second system obtaining the unit spectrum resource. The degree of requirement of the second systems to the spectrum may be defined as imminence degree of requirement of the second systems to utilize the spectrum resources of the first system. For example, the requirement of the second system which performs a real-time video telephone service to the spectrum resources is generally larger than that of the second system which performs a non real-time data transmission service, and therefore the second system which performs the real-time video telephone service may have a higher priority to be allocated the unit spectrum resources.

The unit spectrum resource benefit meeting the requirement of the second system may be re-calculated after each time allocating the unit spectrum resources, or after each round allocating the unit spectrum resources (that is, after all of the second systems meeting the requirement have been allocated the unit spectrum resources). Or the unit spectrum resource benefit may be calculated once before starting allocation of the unit spectrum resources and never be updated thereafter.

Hereinafter the method will be described more specifically.

It is assumed that the unit spectrum resource benefit is $b_n, n=1,2,\ldots N$ corresponding to N determined second systems. The total benefit produced by these second systems utilizing the spectrum resources may be expressed by:

$$Q = \sum_{n=1}^{N} c_n b_n \qquad (2)$$

wherein $c_n$ indicates available spectrum resources allocated to each second system, which may be expressed by power, bandwidth or transmission speed. Herein, it is assumed that the bandwidth of each second system is w, and the power is determined by the allocation solution to be determined herein. Therefore the available resources are indicated by power $P_n$. Then the total benefit may be expressed by:

$$Q = \sum_{n=1}^{N} w P_n b_n \qquad (3)$$

With respect to each first system, these second systems may produce aggregation interference at the first system, and the interference is severest at a certain position. Transmission loss from the nth second system to the kth first system at the position at which the interference is severest is $g\_(n,k)$. Therefore, corresponding to K first systems, the allocation of these second systems shall meet:

$$\sum_{n=1}^{N} g_{n,k} P_n < U_k; k = 1, 2, \ldots, K \qquad (4)$$

wherein $U_k$ is upper limit of acceptable maximum interference of the kth primary system in the region in which the interference is severest.

If there is no upper limit requirement to the interference to the primary system, and there is only a requirement that the interference shall be as small as possible, equation (4) may be rewrote to:

$$\text{minimize} \sum_{n=1}^{N} g_{n,k} P_n \qquad (5)$$

Therefore the power allocation problem may be described as:

$$\text{maxmize } Q = \sum_{n=1}^{N} w P_n f_n(P_1, P_2, \ldots, P_N) \qquad (6)$$

$$\text{subject to } \sum_{n=1}^{N} g_{n,k} P_n < U_k; k = 1, 2, \ldots, K \qquad (7)$$

$$\text{and } P_n \geq 0 \qquad (8)$$

wherein $f_n(P_1, P_2, \ldots P_N)$ indicates the unit spectrum resource benefit of the nth second system in the case that N second system may utilize the spectrum. That is, within the limit of interference to the first system, spectrum utilization benefit of the second system is maximized. Equation (7) may be replaced with equation (5). At this time the optimization problem changes to maximize the spectrum utilization benefit of the second system while the interference to the first system is reduced as far as possible. If spectrum usage of respective second systems is independent of each other, $f_n(P_1, P_2, \ldots P_N)$ may change to be a function with one variable $P_n$.

If spectrum utilizations of respective second systems are correlated to each other, $f_n(P_1, P_2, \ldots P_N)$ may indicate the unit spectrum benefit of the nth second system when there are N−1 second systems and the spectrum resource utilization amounts thereof are P1, ..., P(n−1), P(n+1), ..., PN, in which the spectrum resource utilization amount of the nth second system is $P_n$. At this time, spectrum utilization of one second system may cause influence to spectrum utilization of another second system.

It is assumed that the path loss from the second system n to the second system n−1 is $q_{i,j}$; i=1,2, ... N; j=1,2, ... N; i≠j, and that the spectrum utilization benefit is signal to interference plus noise ratio. Then $f_n(P_1, P_2, \ldots P_N)$ may be expressed by:

$$f_n(P_1, P_2, \ldots, P_N) = \frac{P_n}{\sigma^2 + \sum_{i=1, i \neq n}^{N} q_{i,n} P_i} \quad (9)$$

wherein $\sigma^2$ is system receiver noise. The above equation may be solved in different manners such that the available spectrum resources of each second system may be obtained.

Herein the disclosure provides a simplified algorithm. In order to simplify calculation, solution of the equation may be divided into steps, that is, solving the equation with respect to the acceptable maximum interference of each first system, and then finding the minimum in all of the solutions. With respect to the acceptable maximum interference of the kth first system, the power allocation problem may be weakened to be:

$$\text{maxmize } Q = \sum_{n=1}^{N} w P_n f_n(P_1, P_2, \ldots, P_N) \quad (10)$$

$$\text{subject to } \sum_{n=1}^{N} g_{n,k} P_n < U_k \quad (11)$$

$$\text{and } P_n \geq 0 \quad (12)$$

It is assumed that the power of the second system has an upper limit $\hat{P}$ (communication device in communication system can not use infinite power), $\hat{P}$ is divided into L intervals from 0, and each interval is $\hat{P}/L$. It is assumed that all of the second systems have the same maximum transmission power, and $P_n$ in the above equation may be expressed by $$P_n = \frac{\hat{P}}{L} \sum_{l=1}^{L} x_{n,l}$$

wherein $x_{n,1} \in \{0,1\}$. The method for solving the above equation is to allocate the spectrum resources to the secondary system preferentially which only utilizes unit spectrum to produce large spectrum benefit and has a litter contribution to the aggregation interference. The steps thereof are shown in the flowchart of FIG. 7.

Figure 7:
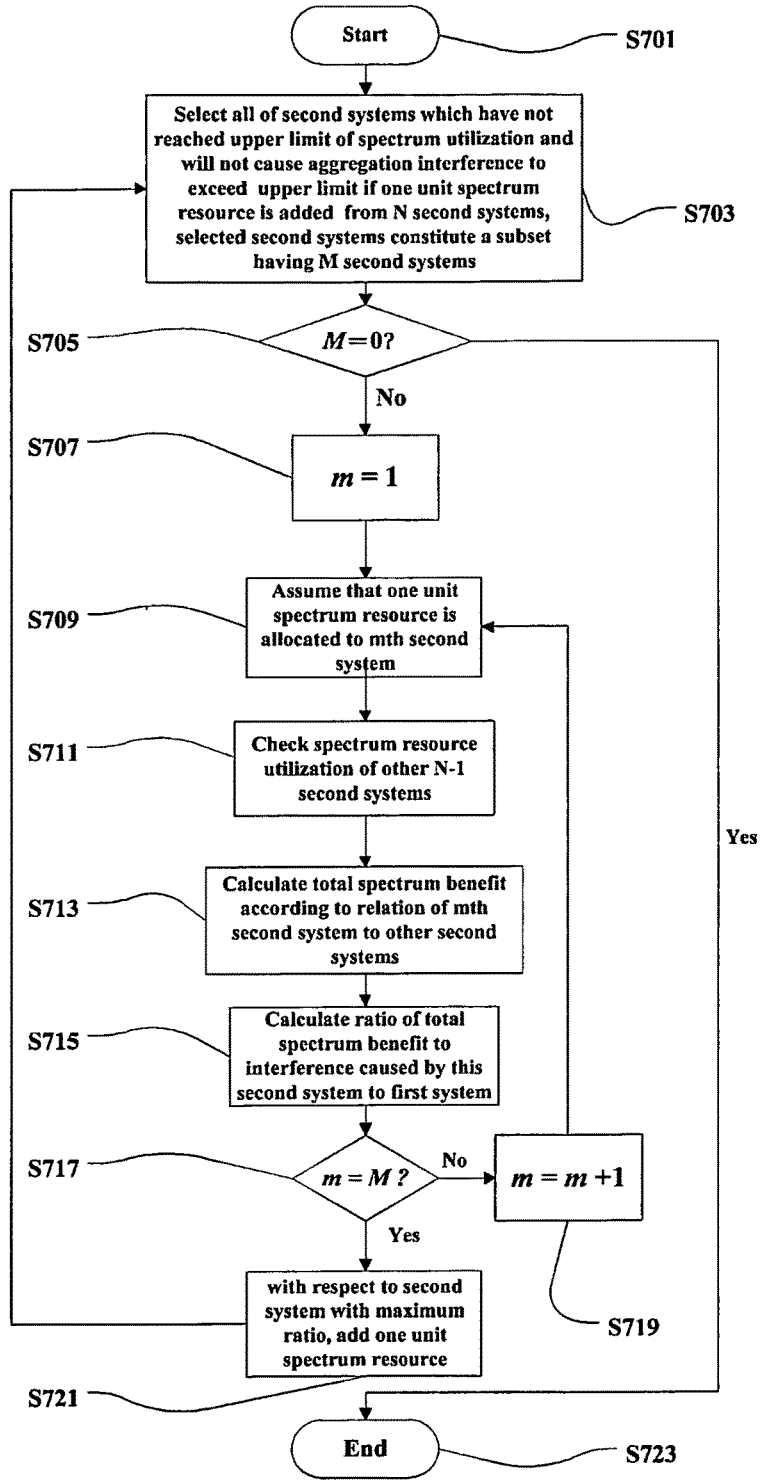
FIG. 7 is a flowchart illustrating a specific method for determining an allocation solution of the spectrum resources.

The spectrum resource allocation process shown in FIG. 7 starts from step S701 and proceeds to step S703.

At step S703, all of the second systems which have not reached the upper limit of spectrum utilization and will not cause the aggregation interference to exceed the upper limit if one unit spectrum resource is added are selected from N second systems, and the selected second systems constitute a subset having M second systems. Then the process proceeds to step S705.

At step S705, it is decided whether M is zero. In other words, it is decided whether there is a second system as described above.

If the decision result is yes, the process proceeds to step S723 and the process ends.

If the decision result is no, the process proceeds to step S707.

At step S707, m is assumed to be 1, and the process proceeds to step S709.

At step S709, one unit spectrum resource is assumed to be allocated to mth second system, and the process proceeds to step S711.

At step S711, the spectrum resource utilization of other N−1 second systems is checked, and the process proceeds to step S713.

At step S713, total spectrum benefit is calculated according to the relation of the mth second system to the other second systems, and the process proceeds to step S715.

At step S715, ratio of the total spectrum benefit to interference caused by the mth second system to the primary system is calculated, and the process proceeds to step S717.

At step S717, it is decided whether m is equal to M.

If the decision result is no, the process proceeds to step S719.

At step S719, the value of m is increased by 1, and the process returns to step S705.

If the decision result is yes, the process proceeds to step S721.

At step S721, with respect to the calculated ratios, a second system with maximum ratio is selected. In other words, a second system with maximum unit spectrum benefit is selected and is allocated one spectrum resource. Then the process proceeds to step S703.

When allocation of spectrum to the second systems with respect to each first system is completed, the minimum value of spectrum available for each second system is taken as the final allocation result.

As described above, the spectrum management method according to the embodiment of the disclosure has been explained. According to such spectrum management method, a better allocation of the spectrum resources of the first system may be achieved. It should be noted that the resource allocation solution of the embodiment may be independent of the determination process of the second systems to be managed. In other words, after the object to be allocated is determined by any other existing technique, the resource allocation solution of the embodiment may be used.

5. Configuration of the Spectrum Management Apparatus

The spectrum management apparatus according to the embodiment of the disclosure will be described in conjunction with FIG. 8 below.

Figure 8:
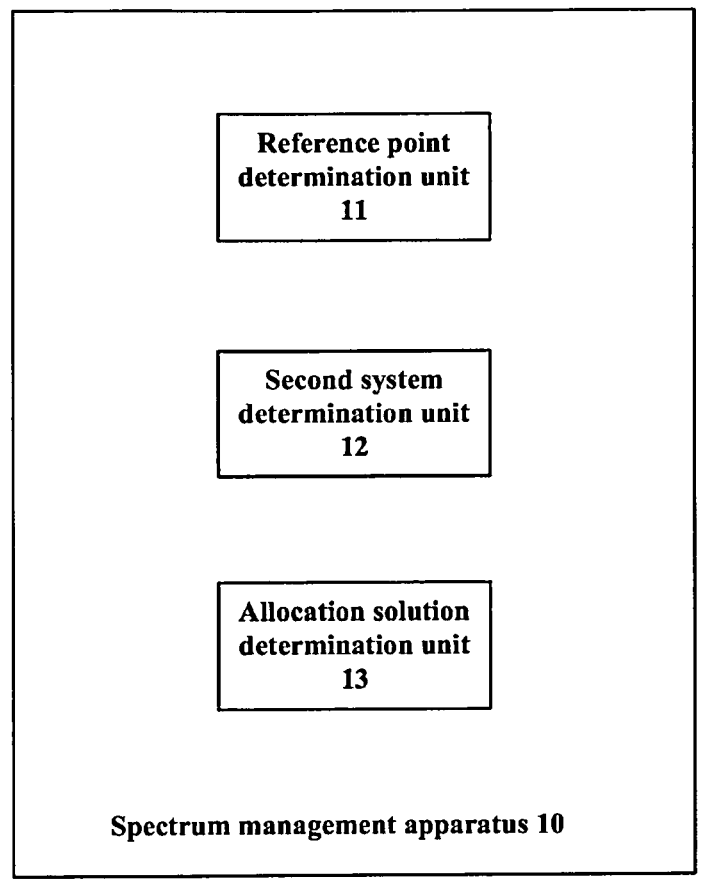
FIG. 8 is a block diagram illustrating configuration of a spectrum management apparatus according to a embodiment of the disclosure.

The spectrum management apparatus 10 shown in FIG. 8 comprises a reference point determination unit 11, a second system determination unit 12 and an allocation solution determination unit 13.

The reference point determination unit 11 may determine a reference point comprising at least one parameter indicating corresponding spectrum usage of the second system. More specifically, the reference point determination unit 11 may perform the step of determining the reference point as described above.

The second system determination unit 12 may determine, based on the reference point, at least one second system to be the second system occupying the spectrum resources of the first system. More specifically, the second system determination unit 12 may perform the step of determining the second system as described above.

The allocation solution determination unit 13 may determine an allocation solution of allocating the spectrum resources of the first system to the second system. More specifically, the allocation solution determination unit 13 may perform the step of determining the allocation solution as described above.

It should be understood by those ordinary skilled in the art that each of functional units of the spectrum management apparatus 10 may be constructed in one casing, or located at different positions and only connected with each other functionally.

In addition, the spectrum management apparatus 10 may only comprise the reference point determination unit 11, and the operations corresponding to the operations of the second system determination unit 12 and the allocation solution determination unit 13 may be performed by other devices.

The spectrum management apparatus 10 may also only comprise the second system determination unit 12, and the operations corresponding to the operations of the reference point determination unit 11 and the allocation solution determination unit 13 may be performed by other devices.

The spectrum management apparatus 10 may also only comprise the allocation solution determination unit 13, and the operations corresponding to the operations of the reference point determination unit 11 and the second system determination unit 12 may be performed by other devices.

According to the above spectrum management apparatus, a better allocation of the spectrum resources of the first system may be achieved.

6. Specific Application Scenario of the Embodiment of the Disclosure

Many countries in Europe have completed or are completing conversion from analog television to digital television. Many countries are studying how to utilize the television broadcast frequency band by the communication system without interference to the television broadcast service. The most popular control manner is to utilize a database. Each country may store the digital television spectrum usage in a management database thereof. When a communication system wants to utilize the television spectrum in a certain region, the spectrum management apparatus responsible for managing the spectrum usage in this region may calculate available spectrum resources for the new communication system (for example, may be described by time, bandwidth, frequency band, transmission power and the like) according to the spectrum usage of the television broadcast service stored in the management database and practical situation of the communication system which is utilizing the television spectrum. Many countries in Europe border each other, and the spectrum utilization of a country may interfere with the spectrum utilization of television broadcast systems of other countries. Therefore, there is a need for coordination when adjacent countries use the spectrum.

When spectrum owners in many countries come to an agreement that occupation of the spectrum of the primary system by the secondary system shall incur related fees, these countries may calculate the reference point of spectrum utilization at the border region. At this time, the object of spectrum allocation is to maximize the total economical benefit. The function $f_n$ $(P_1, P_2, \ldots P_N)$ in equation (6) correspondingly changes to the fees which shall be paid when using the unit spectrum resources. Thereby, the spectrum owner of the first system (television broadcast system) in each country may maximize the earnings of the spectrum utilization, and then allocate the earnings according to the agreement between the countries.

As shown in FIG. 2, geographic databases X and Y manage information of utilizing the spectrum of the first system in two countries and calculate available spectrum resources for the second systems according to related provisions respectively. The spectrum management apparatuses 10-1, 10-2 and 10-3 of the second systems manage spectrum usage of different second systems (such as WiFi network and LTE cell). These spectrum management apparatuses receive requirements for using the spectrum from the second systems respectively. Herein the reference point information sender is a spectrum management apparatus, for example the spectrum management apparatus 10-2. The reference point information receiver is the spectrum management apparatuses 10-1 and 10-3. When the spectrum management apparatus 10-2 sends the reference point information to the spectrum management apparatuses 10-1 and 10-3, each of the spectrum management apparatuses 10-1 and 10-3 provides information regarding the second system it manages (comprising new second system and the second system which is utilizing the spectrum resources of the first system but needs additional spectrum resources and the like) and system parameters (transmission template, antenna height, air interface standard and the like) to the spectrum management apparatus 10-2, and the spectrum management apparatus 10-2 determines the second system which participates in allocation of the spectrum and determines the allocation solution of the spectrum. In addition, the spectrum management apparatuses 10-1 and 10-3 may selectively recommend a second system to the spectrum management apparatus 10-2 according to priori knowledge and the received reference point information in order to improve the probability that the recommended second system is determined successfully to be the second system which participates in allocation of the spectrum resources.

FIG. 3 illustrates another application scenario. One spectrum management apparatus 10-4 is responsible for allocating spectrum to a plurality of second systems (such as WiFi network and LTE cell). When the spectrum management apparatus 10-4 determines the reference point, it sends reference point information to each of second systems. At this time, each of second systems (base station of the second system) is the reference point information receiver. After receiving the reference point information, the second system may determine the geographic position and system parameters according to the GPS information thereof and send such information to the spectrum management apparatus 10-4. The spectrum management apparatus 10-4 may determine the second system which participates in allocation of the spectrum resources according to the information provided by the second systems and determine the allocation solution of the spectrum resources.

7. Hardware Configuration Example

The spectrum management method and the spectrum management apparatus according to the embodiment of the disclosure may be configured by software, firmware, hardware or the combination thereof. In case of implementing by software or firmware, program constituting the software or firmware may be mounted to a machine having a dedicated hardware structure from a storage medium or network (for example, the universal computer 900 as illustrated in FIG. 9), when the computer is mounted with various programs, the computer may execute various functions of the components and units as describe above.

Figure 9:
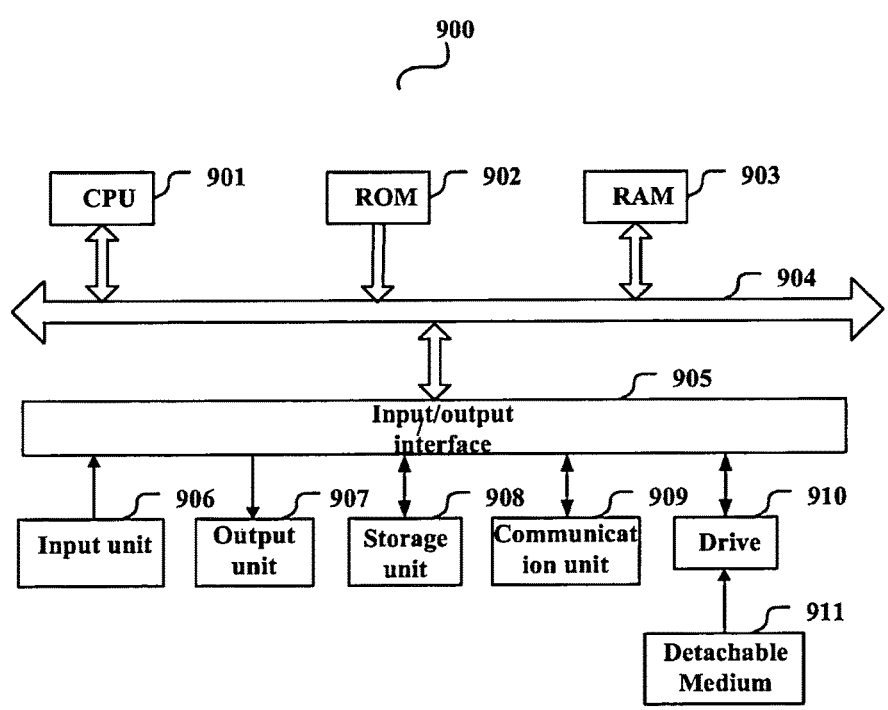
FIG. 9 is a block diagram illustrating a hardware configuration according to a embodiment of the disclosure.

In FIG. 9, a central processing unit (CPU) 901 perform various processes according to the program stored in the Read-Only Memory (ROM) 902 or programs load from the storage unit 908 to the Random Access Memory (RAM) 903. In the RAM 903, store also data required when the CPU 901 performs various processes. CPU 901, ROM 902 and RAM 903 are connected from one to another via bus 904. Input/output interface 905 is also connected to the bus 904.

The following components are connected to the input/output interface 905: input unit 906 (comprising keyboard, mouse, etc.); output unit 907 (comprising display, such as cathode ray tube (CRT), liquid crystal display (LCD), etc., and speakers and so on); storage unit 908 (comprising hard disc, etc.); and communication part 909 (comprising network interface cards such as LAN cards, modems and so on). The communication unit 909 performs communication process via network like the internet. According to requirements, drive 910 is also connected to the input/output interface 905. Detachable medium 911 such as disc, CD, magneto-optical disc, semiconductor memory, and so on is installed on the drive 910 based on requirements, such that the computer program read out therefrom is installed in the storage unit 908 based on requirements.

In case of implementing the above processes by software, programs constituting the software are installed from a network like the Internet or from a storage medium like the detachable medium 911.

Those skilled in the art should be understood that such storage medium is not limited to the detachable medium 911 which is stored with programs and distributes separate from the method to provide a user with program as illustrated in FIG. 9. The example of the detachable medium 911 comprises disc (comprising floppy disc (registered marks)), CD (comprising CD read only memory (CD-ROM) and digital versatile disc (DVD)), magneto-optical disc (comprising mini-disc (MD) (registered marks)) and semiconductor memory. Alternatively, the storage medium may be ROM 902, or hard disc comprised in the storage unit 908 in which a program is stored and the program is distributed to a user with the method comprising the same.

The disclosure also provides a program product storing machine readable instruction code. When read and executed by a machine, the instruction code may implement the communication methods according to the embodiments of the disclosure. Correspondingly, various storage medium for carrying the program product such as magnetic disk, optical disk, magneto-optical disk, semiconductor memory, etc. is also comprised in the disclosure.

In addition, obviously, respective operations of the communication methods according to the embodiments of the disclosure may also be implemented in a manner of computer executable program stored in various machine readable storage mediums.

Furthermore, the present advancements may have the following exemplary configurations.

(1) A spectrum management system, comprising: circuitry configured to identify reference point information for a secondary communication system, determine spectrum resources for the secondary communication system based on whether the reference point information is positive or negative.

(2) The spectrum management system of (1), wherein when the reference information is positive, the circuitry determines that the secondary communication system is a candidate for spectrum resources.

(3) The spectrum management system of any one of (1) to (2), wherein when the reference information is negative, the circuitry determines that the secondary communication system is not a candidate for spectrum resources.

(4) The spectrum management system of any one of (1) to (3), wherein when the circuitry determines that the secondary communication system is not a candidate for resources, the circuitry reconfigures the secondary communication system to release at least a subset of spectrum resources currently used by the secondary communication system.

(5) The spectrum management system of any one of (1) to (4), wherein the circuitry is further configured to provide another spectrum management system with information regarding the secondary communication system managed by the spectrum management system.

(6) The spectrum management system of any one of (1) to (5), wherein the information regarding the secondary communication system managed by the spectrum management system includes information indicating that at least the subset of spectrum resources used by the secondary communication system managed by the spectrum management system has been released.

(7) The spectrum management system of any one of (1) to (6), wherein the circuitry is further configured to receive, from the other spectrum management system, information regarding at least one secondary communication system managed by the other spectrum management system.

(8) The spectrum management system of (1), wherein the circuitry identifies the reference point information of the secondary communication system based on proximity of the secondary communication system thereto.

(9) The spectrum management system of (1), wherein the reference point information includes at least one characteristic of another secondary communication system. The other secondary communication system can be a physical secondary communication system or a simulated secondary communication system based on history record etc.

(10) The spectrum management system of any one of (1) to (9), wherein the reference point information is positive when the other secondary communication system has available spectrum resources for the secondary communication system.

(11) The spectrum management system of any one of (1) to (10), wherein the reference point information includes at least one of location and frequency band information of the other secondary communication system.

(12) The spectrum management system of any one of (1) to (11), wherein the reference point information is negative when the other secondary communication system requires spectrum resources.

(13) The spectrum management system of any one of (1) to (12), wherein the reference point information is negative if the other secondary communication system has priority over the secondary communication system for spectrum resource assignment.

(14) The spectrum management system of any one of (1) to (13), wherein when the circuitry determines that a plurality of secondary communication systems are candidates for spectrum resources, the circuitry further determines the spectrum resources for each of the plurality of secondary communication systems based on interference to other communication systems.

(15) The spectrum management system of (1) to (14), wherein the circuitry further determines spectrum resources for each of the plurality of secondary communication systems based on the interference to the other communication systems and a degree of requirement of the spectrum resources.

(16) The spectrum management system of (1), wherein the spectrum resources are television (TV) band spectrum resources and the secondary communication system is a communication system not authorized to use TV band spectrum resources.

(17) The spectrum management system of (1), wherein the spectrum management system manages the secondary communication system.

(18) The spectrum management system of (1), wherein the reference point information is received from another spectrum management system.

(19) A method of spectrum management, comprising: identifying, with circuitry of a spectrum management system, reference point information for a secondary communication system; and determining, by the circuitry of the spectrum management system, spectrum resources for the secondary communication system based on whether the reference point information is positive or negative.

(20) A non-transitory computer-readable medium encoded with computer-readable instructions thereon, the compute-readable instructions, when executed by a computer, cause the computer to perform a method comprising: identifying reference point information for a secondary communication system; and determining spectrum resources for the secondary communication system based on whether the reference point information is positive or negative.

(21) A spectrum management method for managing a second system's utilization of spectrum resources of a first system, wherein the second system's priority of using spectrum is lower than that of the first system, the spectrum management method comprising: determining a reference point comprising at least one parameter indicating corresponding spectrum usage of the second system; determining, based on the reference point, at least one second system to be the second system occupying the spectrum resources of the first system; and determining an allocation solution of allocating the spectrum resources of the first system to the at least one second system.

(22) The spectrum management method of (21), wherein: the spectrum usage comprises at least one of geographic position, air interface information, antenna height, transmission template and frequency band of the second system.

(23) The spectrum management method of any one of (21) to (22) wherein: the reference point comprises at least one of a positive reference point and a negative reference point, wherein the positive reference point corresponds to the spectrum usage which is advantageous to utilize the spectrum resources of the first system with respect to at least one of the parameters comprised in the positive reference point, and the negative reference point corresponds to the spectrum usage which is disadvantageous to utilize the spectrum resources of the first system with respect to at least one of the parameters comprised in the positive reference point.

(24) The spectrum management method of any one of (21) to (23), wherein: the reference point is determined in at least one of following manners: based on history record of the spectrum usage, estimating at least a part of spectrum usage among spectrum usage of each second system, based on the degree of the spectrum resources of the first system utilized by the second system meeting such second system's service requirement, and based on information, from the second system, of the corresponding second system releasing the spectrum resources of the first system occupied by such second system.

(25) The spectrum management method of (24) wherein: in the case that the reference point is determined by estimating the at least a part of spectrum usage, the spectrum usage, in which the interference to the first system is lower than a first interference threshold and the spectrum resources which are able to be allocated to the second system is the most, among the at least a part of spectrum usage is determined to be the reference point.

(26) The spectrum management method of any one of (23) to (24), wherein: the spectrum usage, in which the spectrum resources of the first system utilized by the second system does not meet such second system's service requirement, is determined to be the negative reference point.

(27) The spectrum management method of any one of (23) to (26), wherein: the spectrum usage, in which the second system releases the spectrum resources of the first system occupied by such second system, is determined to be the positive reference point.

(28) The spectrum management method of any one of (21) to (27), wherein: the at least one second system is determined based on the degree of similarity between spectrum usage of the second system and the reference point or based on the degree of the similarity and the priorities of the second system.

(29) The spectrum management method of (23), wherein: the second system, in which the degree of similarity between spectrum usage of such second system and the positive reference point is higher than a first positive threshold and/or the degree of similarity between spectrum usage of such second system and the negative reference point is lower than a first negative threshold, is determined to be the at least one second system.

(30) The spectrum management method of any one of (23) or (29), wherein: the second system, in which the degree of similarity between spectrum usage of such second system and the positive reference point is lower than a second positive threshold and/or the degree of similarity between spectrum usage of such second system and the negative reference point is higher than a second negative threshold, is determined to be the at least one second system.

(31) The spectrum management method of (13), wherein: the spectrum resources of the first system occupied by the second system, in which the degree of similarity between spectrum usage of such second system and the negative reference point is higher than the second negative threshold, is released.

(32) The spectrum management method of any one of (21) to (31), further comprising: announcing the determined reference point, wherein the at least one second system is determined based on the reference point and according to the second system recommended in response to the announced reference point.

(33) The spectrum management method of any one of (21) to (32), wherein: the allocation solution of allocating the spectrum resources of the first system to the at least one second system is determined in following manner: when the number of the at least one second system is more than 1, dividing all the spectrum resources of the first system, which are able to be allocated to the at least one second system, into a plurality of unit spectrum resources, and allocating, in a predetermined pattern, the unit spectrum resources to the second systems, each of which has not reached the upper limit of spectrum usage yet, and in each of which such second system's interference to the first system does not reach a second interference threshold in the case that such unit spectrum resource is already allocated to such second system, until all the unit spectrum resources have been allocated or until there is no more second system, each of which has not reached the upper limit of spectrum usage yet, and in each of which such second system's interference to the first system does not reach the second interference threshold in the case such unit spectrum resource is already allocated to such second system.

(34) The spectrum management method of (33), wherein: when allocating the unit spectrum resources to the second system, the allocation is performed in a descending order of the unit spectrum resource benefit, or in a descending order of the degree of requirement of the second systems to the spectrum.

(35) The spectrum management method of (34), wherein: the unit spectrum resource benefit is at least one of the service increment and the economic benefit brought by each time the second system obtaining the unit spectrum resource.

(36) The spectrum management method of any one of (21) to (35), wherein: the first system is a television broadcast system, and the second system is a wireless local area net system.

(37) A spectrum management apparatus for managing a second system's utilization of spectrum resources of a first system, wherein the second system's priority of using spectrum is lower than that of the first system, the spectrum management apparatus comprising: a reference point determination unit configured to determine a reference point comprising at least one parameter indicating corresponding spectrum usage of the second system; a second system determination unit configured to determine, based on the reference point, at least one second system to be the second system occupying the spectrum resources of the first system; and an allocation solution determination unit configured to determine an allocation solution of allocating the spectrum resources of the first system to the at least one second system.

(38) A spectrum management apparatus for managing a second system's utilization of spectrum resources of a first system, wherein the second system's priority of using spectrum is lower than that of the first system, the spectrum management apparatus comprising: a reference point determination unit configured to determine a reference point comprising at least one parameter indicating corresponding spectrum usage of the second system, wherein: at least one second system as the second system occupying the spectrum resources of the first system is determined based on the reference point, and an allocation solution of allocating the spectrum resources of the first system to the at least one second system is determined based on the at least one second system.

(39) A spectrum management apparatus for allocating spectrum resources of a first system to a second system, the spectrum management apparatus comprising: a second system determination unit configured to determine, based on a determined reference point, at least one second system to be the second system occupying the spectrum resources of the first system, wherein the reference point comprises at least one parameter indicating corresponding spectrum usage of the second system, and an allocation solution of allocating the spectrum resources of the first system to the at least one second system is determined based on the at least one second system.

(40) A spectrum management apparatus for allocating spectrum resources of a first system to a second system, the spectrum management apparatus comprising: an allocation solution determination unit configured to determine an allocation solution of allocating the spectrum resources of the first system to at least one second system as the second system occupying the spectrum resources of the first system, wherein the at least one second system is determined based on a determined reference point, and the reference point comprises at least one parameter indicating corresponding spectrum usage of the second system.

Although preferable embodiments of the disclosure have been described above, the above description are only used to illustrate the disclosure, and do not limit the disclosure. For those skilled in the art, various features of the embodiments of the disclosure may be changed, substituted, combined and combine in part without departing from the scope of the disclosure. Therefore, the scope of the disclosure is only defined by the attached claims.

The invention claimed is:

1. A spectrum management system, comprising:
a plurality of components, circuitry in the plurality of components configured to identify reference point information for a secondary communication system,
the secondary communication system having a priority of spectrum use which is lower than a priority of spectrum use of a primary communication system,
determine spectrum resources for the secondary communication system based on whether the reference point information is positive or negative,
wherein the reference point information includes at least one characteristic of another secondary communication system; and
a network interface configured to provide communication between the secondary communication system and the circuitry,
wherein the reference point information is positive when the other secondary communication system has available spectrum resources for the secondary communication system.

2. The spectrum management system, according to claim 1, wherein when the reference point information is positive, the circuitry determines that the secondary communication system is a candidate for spectrum resources.

3. The spectrum management system according to claim 2, wherein when the circuitry determines that a plurality of secondary communication systems are candidates for spectrum resources, the circuitry further determines the spectrum resources for each of the plurality of secondary communication systems based on interference to other communication systems.

4. The spectrum management system according to claim 3, wherein the circuitry further determines spectrum resources for each of the plurality of secondary communication systems based on the interference to the other communication systems and a degree of requirement of the spectrum resources.

5. The spectrum management system, according to claim 1, wherein when the reference point information is negative, the circuitry determines that the secondary communication system is not a candidate for spectrum resources.

6. The spectrum management system, according to claim 5, wherein when the circuitry determines that the secondary communication system is not a candidate for resources, the circuitry reconfigures the secondary communication system to release at least a subset of spectrum resources currently used by the secondary communication system.

7. The spectrum management system according to claim 6, wherein the circuitry is further configured to provide another spectrum management system with information regarding the secondary communication system managed by the spectrum management system.

8. The spectrum management system according to claim 7, wherein the information regarding the secondary communication system managed by the spectrum management system includes information indicating that at least the subset of spectrum resources used by the secondary communication system managed by the spectrum management system has been released.

9. The spectrum management system according to claim 8, wherein the circuitry is further configured to receive, from the other spectrum management system, information regarding at least one secondary communication system managed by the other spectrum management system.

10. The spectrum management system according to claim 1, wherein the circuitry identifies the reference point information of the secondary communication system based on proximity of the secondary communication system thereto.

11. The spectrum management system according to claim 1, wherein the reference point information includes at least one of location and frequency band information of the other secondary communication system.

12. The spectrum management system according to claim 1, wherein the reference point information is negative when the other secondary communication system requires spectrum resources.

13. The spectrum management system according to claim 1, wherein the reference point information is negative if the other secondary communication system has priority over the secondary communication system for spectrum resource assignment.

14. The spectrum management system according to claim 1, wherein the spectrum resources are television (TV) band spectrum resources and the secondary communication system is a communication system not authorized to use TV band spectrum resources.

15. The spectrum management system according to claim 1, wherein the spectrum management system manages the secondary communication system.

16. The spectrum management system according to claim 1, wherein the reference point information is received from another spectrum management system.

17. A method of spectrum management, comprising:
identifying, with circuitry of a spectrum management system, reference point information for a secondary communication system, the secondary communication system having a priority of spectrum use which is lower than a priority of spectrum use of a primary communication system; and
determining, by the circuitry of the spectrum management system, spectrum resources for the secondary communication system based on whether the reference point information is positive or negative,
wherein the reference point information includes at least one characteristic of another secondary communication system, and
wherein the reference point information is positive when the other secondary communication system has available spectrum resources for the secondary communication system.

18. A non-transitory computer-readable medium encoded with computer-readable instructions thereon, the compute-readable instructions, when executed by a computer, cause the computer to perform a method comprising:
identifying reference point information for a secondary communication system, the secondary communication system having a priority of spectrum use which is lower than a priority of spectrum use of a primary communication system; and
determining spectrum resources for the secondary communication system based on whether the reference point information is positive or negative,
wherein the reference point information includes at least one characteristic of another secondary communication system, and
wherein the reference point information is positive when the other secondary communication system has available spectrum resources for the secondary communication system.

* * * * *